Patented June 29, 1954

2,682,522

UNITED STATES PATENT OFFICE 2,682,522

PROCESS FOR PREPARING POLYMERIC ORGANO-PHOSPHONATES

Harry W. Coover, Jr., and Marvin A. McCall, Kingsport, Tenn., assignors to Eastman Kodak Company, Rochester, N. Y., a corporation of New Jersey No Drawing. Application September 10, 1952, Serial No. 308,927

6 Claims. (Cl. 260—47)

This invention relates to resinous condensation products of dihydroxy aromatic compounds and organo-phosphonic acid diphenyl esters and more particularly to an improved process for preparing such resins.

We have made the important discovery that diphenyl esters of alkane- and arylphosphonates can be condensed with dihydroxy aromatic compounds, in the presence of an alkaline earth catalyst, with the liberation of phenol to give high molecular weight, resinous, linear polymers, which are essentially polymeric organo-phosphonates. The process is particularly advantageous because the presence of any residual phenol has no deleterious effect on the polymer. The products are useful for the preparation of molded or extruded objects and materials having remarkable properties.

It is an object of the invention, accordingly, to provide a new and economical process for the preparation of resinous, linear condensation products of dihydroxy aromatic compounds and organo-phosphonic acid diphenyl esters. Other objects will become apparent hereinafter.

In accordance with the invention, we prepare our resinous linear condensation products comprising the recurring structural unit

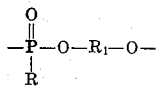

wherein R represents a monovalent hydrocarbon radical such as an alkyl group containing from 1 to 12 carbon atoms (e. g. methyl, ethyl, propyl, isopropyl, butyl, sec. butyl, decyl, dodecyl, etc. groups), a chloroalkyl group containing from 1 to 12 carbon atoms (e. g. chloromethyl, chloroethyl, etc. groups), an aryl group (e. g. phenyl or tolyl groups), a benzyl group, a cycloalkyl group (e. g. cyclopentyl and cyclohexyl groups) and R1 represents an aromatic nucleus such as a benzene nucleus, a diphenylene nucleus, a naphthalene nucleus, etc., by heating a mixture of approximately equimolar quantities of a dihydroxy aromatic compound and a diphenyl ester of an organo-phosphonic acid having the general formula:

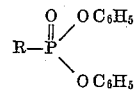

wherein R is as above defined, at a temperature of from 100°–400° C., but preferably from 150°–260° C., in the presence of an anhydrous alkaline-earth halide condensation catalyst (e. g. calcium chloride, zinc chloride, etc., but preferably anhydrous magnesium chloride), until no more phenol distills over. At this point, the condensation reaction is substantially complete, but somewhat higher molecular weight products can be obtained by continuing the heating at reduced pressure. The first stage of the condensation is carried out preferably at normal or higher than normal atmospheric pressures. If desired, an inert reaction medium can be employed. The amount of catalyst can vary from about 0.1 to 3.0 per cent or even higher, based on the total weight of the reactants. Mixtures of one or more of the organo-phosphonic acid diphenyl of the dihydroxy phenols can be employed. In the process as described, the condensation takes place in the proportion of one mole of the dihydroxy aromatic compound to each mole of the diphenyl organo-phosphonate compound.

Suitable organo-phosphonic acid diphenyl esters include the diphenyl esters of methane phosphonic acid, ethanephosphonic acid, propanephosphonic acid, isopropanephosphonic acid, butane phosphonic acid, sec. butane phosphonic acid, hexanephosphonic acid, decanephosphonic acid, dodecane phosphonic acid, chloromethane phosphonic acid, β-chloroethane phosphonic γ-chloropropane phosphonic acid, benzene phosphonic acid, p-toluene phosphonic acid, o-toluenephosphonic acid, phenylmethanephosphonic acid, cyclopentane phosphonic acid, cyclohexanephosphonic acid, etc. Suitable dihydroxy aromatic compounds that can be employed in the practice of our invention include resorcinol, catechol, hydroquinone, dihydroxy toluenes, dihydroxy xylenes, dihydroxydiphenyl such as p,p'-dihydroxy diphenyl, dihydroxydiphenyl sulfones such as p,p'-dihydroxydiphenyl sulfone, and the like.

The following examples will serve further to illustrate our new process for preparing resinous, linear polyphosphonates.

*Example 1*

A mixture of 0.1 mole of hydroquinone, 0.1 mole of diphenyl chloromethanephosphonate and 0.1 gram of anhydrous magnesium chloride was stirred slowly while the temperature was gradually raised to 200° C. At this temperature, phenol began distilling from the reaction mixture. After approximately 1–2 hours, the temperature was slowly raised to 250° C. and held at this temperature for a period of about 4–5 hours under a vacuum of 1–2 mm. Care should be taken not to place the reaction mixture under high vacuum until sufficiently high molecular weight polymer has formed so that none of the monomeric diphenyl chloromethanephosphonate distills from the reaction mixture. The resultant polymer was a hard, tough, amber-colored material which could be readily extruded or injection molded.

In place of the diphenyl chloromethanephosphonate in the above example, there can be substituted therein an equivalent amount of other diphenyl alkane phosphonates, for example, diphenyl ethanephosphonate or diphenyl n-butane phosphonate to give the corresponding resinous, linear polyphosphonates of hydroquinone condensed with diphenyl ethanephosphonate, or condensed with diphenyl n-butane phosphonate.

*Example 2*

A mixture of resorcinol (0.1 mole), diphenyl benzenephosphonate (0.11 mole) and anhydrous magnesium chloride (0.1 g.) was stirred slowly while the temperature was raised to 150° C. and maintained at this point for one hour. The temperature was then slowly raised to 250° C. over a period of 2-3 hours. Heating at 250° C. was continued for 3 hours under a pressure of 1-2 mm. The resultant polymer was a hard, brittle material which could be readily extruded or injection molded, and had a softening point of 120° C.

In place of the diphenyl benzenephosphonate in the above example, there can be substituted therein an equivalent amount of any other of the mentioned diphenyl alkane- or arylphosphonates, for example, diphenyl n-butanephosphonate to give the corresponding resinous, linear polyphosphonate of resorcinol condensed with diphenyl n-butanephosphonate.

*Example 3*

A mixture of p,p'-dihydroxydiphenyl (0.1 mole), diphenyl benzenephosphonate (0.05 mole), diphenyl heptanephosphonate (0.05 mole) and anhydrous magnesium chloride (0.2 g.) was stirred slowly while the temperature was raised to 160° C. over a period of one hour. The temperature was then raised to 250° C. over a period of 2-3 hours. The reaction mixture was then maintained at 250-260° C. under a pressure of 1-2 mm. for an additional 3-4 hours. The resultant polymer was a clear hard material which could be readily extruded or injection molded. It had a softening point above 105° C.

In any of the preceding examples, the dihydroxy phenol employed therein can be substituted by an equivalent amount of any other of the mentioned dihydroxy phenols to give generally similar resinous polyphosphonates. In general, the products obtained by the process of our invention are hard, tough materials at ordinary temperatures and have softening points in the range of 100°-150° C. In the case of the alkane phosphonates, as the length of the alkane chain is increased, the resultant polymers become more rubbery in nature. At their melting point, the polymers form clear viscous masses and can be readily injection molded or extruded into shaped objects such as fibers, sheets, etc., having unusually good properties. All of the polymers prepared by our new process are non-inflammable. They are soluble in such solvents as dimethyl formamide, dimethylacetamide, methylene chloride, and the like.

What we claim is:

1. A process for preparing resinous, linear polyphosphonates which comprises heating in the presence of an anhydrous alkaline-earth halide condensation catalyst a mixture comprising approximately equimolar quantities of a dihydroxy aromatic compound selected from the group consisting of a dihydroxybenzene and a dihydroxy diphenyl and a dihydroxydiphenyl sulfone, and an organo-phosphonic acid diphenyl ester selected from the group consisting of an alkyl-phosphonic acid diphenyl ester wherein the alkyl group contains from 1 to 12 carbon atoms, a chloroalkylphosphonic acid diphenyl ester wherein the chloroalkyl group contains from 1 to 12 carbon atoms, a phenyl-phosphonic acid diphenyl ester, a tolyl-phosphonic acid diphenyl ester, a benzyl-phosphonic acid diphenyl ester and a cycloalkyl-phosphonic acid diphenyl ester wherein the cycloalkyl group contains from 5 to 6 carbon atoms, at a temperature of from 100°-400° C., until the condensation reaction is substantially complete.

2. A process for preparing a resinous, linear polyphosphonate which comprises heating in the presence of anhydrous magnesium chloride a mixture comprising approximately equimolar quantities of hydroquinone and diphenyl chloromethanephosphonate, at a temperature of from 150°-260° C., until the condensation reaction is substantially complete.

3. A process for preparing a resinous, linear polyphosphonate which comprises heating in the presence of anhydrous magnesium chloride a mixture comprising approximately equimolar quantities of resorcinol and diphenyl benzenephosphonate, at a temperature of from 150°-260° C., until the condensation reaction is substantially complete.

4. A process for preparing a resinous, linear polyphosphonate which comprises heating in the presence of anhydrous magnesium chloride a mixture comprising equimolar quantities of p,p'-dihydroxy diphenyl and diphenyl benzenephosphonate, at a temperature of from 150°-260° C., until the condensation reaction is substantially complete.

5. A process for preparing a resinous, linear polyphosphonate which comprises heating in the presence of anhydrous magnesium chloride a mixture comprising equimolar quantities of hydroquinone and diphenyl ethanephosphonate, at a temperature of from 150°-260° C., until the condensation reaction is substantially complete.

6. A process for preparing a resinous, linear polyphosphonate which comprises heating in the presence of anhydrous magnesium chloride a mixture comprising approximately equimolar quantities of resorcinol and diphenyl n-butane phosphonate, at a temperature of from 150°-260° C., until the condensation reaction is substantially complete.

References Cited in the file of this patent

UNITED STATES PATENTS

| Number | Name | Date |
|---|---|---|
| 2,435,252 | Toy | Feb. 3, 1948 |